United States Patent
Jones

(10) Patent No.: US 6,893,138 B1
(45) Date of Patent: May 17, 2005

(54) ILLUMINATED WINDMILL FOR VIRTUAL COLOR GENERATION

(76) Inventor: Timothy Ray Jones, 5900 S. Meridian Rd., Jackson, MI (US) 49201

(*) Notice: Subject to any disclaimer, the term of this patent is extended or adjusted under 35 U.S.C. 154(b) by 0 days.

(21) Appl. No.: 10/426,142

(22) Filed: Apr. 29, 2003

Related U.S. Application Data

(60) Provisional application No. 60/376,088, filed on Apr. 29, 2002.

(51) Int. Cl.[7] .......................... F21V 33/00; F04D 29/00
(52) U.S. Cl. .................. 362/96; 362/362; 362/192; 362/234; 362/250; 416/5
(58) Field of Search .................. 362/192, 193, 362/234, 253, 800, 96, 238, 250; 40/439–441; 415/2.1, 146; 290/44; 416/5

(56) References Cited

U.S. PATENT DOCUMENTS

| | | | |
|---|---|---|---|
| 1,336,544 A | * 4/1920 | Sullivan | 439/22 |
| 4,565,938 A | * 1/1986 | Fawzy | 310/156.69 |
| 5,061,923 A | * 10/1991 | Miller et al. | 340/5.31 |
| 5,506,453 A | * 4/1996 | McCombs | 290/44 |
| 6,036,331 A | * 3/2000 | Acquisto | 362/96 |
| 6,086,214 A | * 7/2000 | Ridge | 362/96 |
| 6,367,942 B1 | * 4/2002 | Bauer | 362/34 |
| 6,398,381 B1 | * 6/2002 | Tseng | 362/96 |
| 6,575,585 B2 | * 6/2003 | Nelson et al. | 362/35 |

* cited by examiner

Primary Examiner—Sandra O'Shea
Assistant Examiner—Ali Alavi
(74) Attorney, Agent, or Firm—James M. Deimen

(57) ABSTRACT

A device for the generation of two-dimensional and three-dimensional virtual color patterns by the single or multidirectional rotation of a movable body containing light emitters of differing colors. The light emitters may be intermittently or continuously flashed by a wind-powered alternating current generator that also serves as a bearing for rotation. In the preferred embodiments, wind reactive blades take the form of various horizontal or vertical shaft windmills with slender or broad blades.

11 Claims, 2 Drawing Sheets

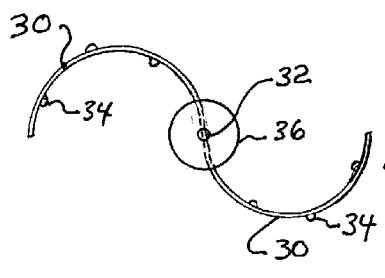
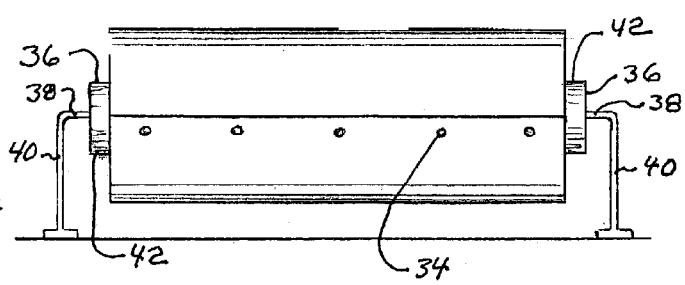
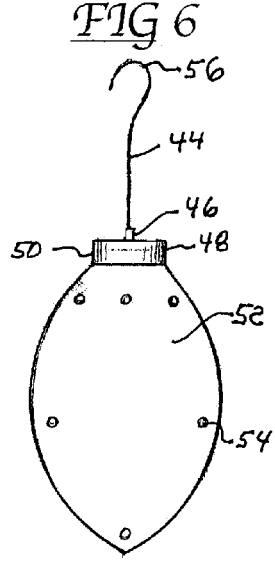
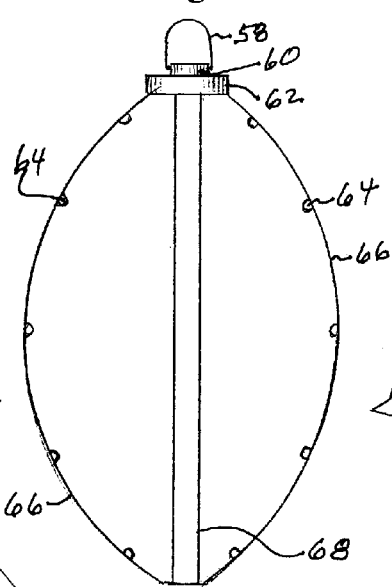
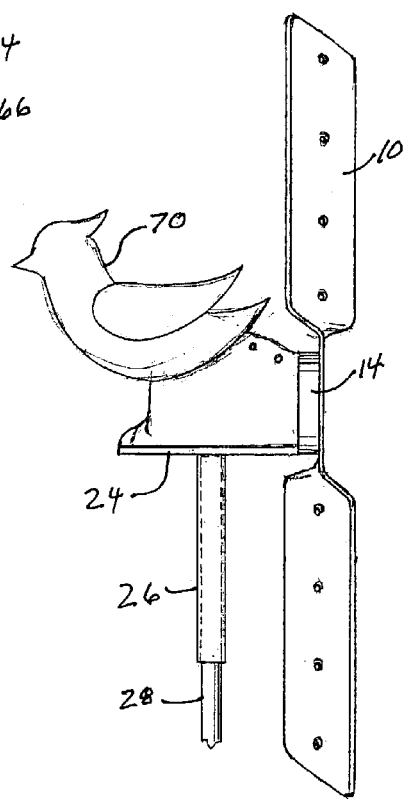
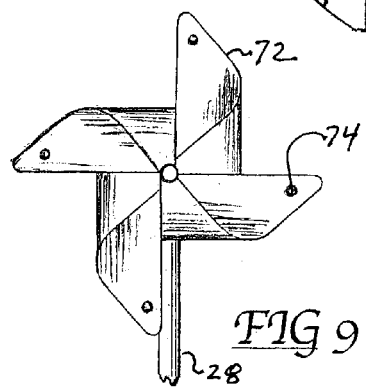

ILLUMINATED WINDMILL FOR VIRTUAL COLOR GENERATION

This application claims the benefit of provisional patent application No. 60/376,088, filed Apr. 29, 2002.

BACKGROUND OF THE INVENTION

The field of the invention pertains to lighted moving decorative and toy devices and, in particular, to lighted devices that generate visual effects as a consequence of the movement.

Much of the conventional passive illuminated and active lighting devices available have drawbacks such as 1) the difficulty and hazards of electric wires from a remote source of power to the device, 2) the expense and problems in establishing numerous devices, particularly at remote locations, 3) the expense and fragility of control electronics or microprocessors to provide entertaining light shows or displays, and 4) the high cost of electromechanical movement actuators for such devices.

SUMMARY OF THE INVENTION

The new illuminated device for the generation of virtual colors comprises self-generation of electric power in response to wind moving through wind reactive blades and electric illumination on the blades. In the preferred embodiment, monochromatic light emitters of distinct colors on the blades rotate about two or more axes. The light emitters are, preferably, alternately biased and pulsated by an alternating current generator or field coil. The light emitters may be mounted so that their respective beams of light are parallel, or mounted at various divergent angles so that the viewing angle of the illuminated device affects the patterns of light emitters perceived and their color.

Light emitters of differing colors may be placed at or near the same radius of rotation for the blade, thereby producing a number of substantially circular paths formed by the afterimage blending effect of human light perception. Light emitters of two or more colors may overlap in the afterimage area to produce various apparent colors as the rotational speed of the blade is altered.

The afterimage effect may be further altered by connecting light emitters such that particular cathodes and anodes are mixed when connected to the poles of an alternating current generator, causing some emitters to be energized while other emitters are de-energized during each phase of the generator cycle. The net effect is an intermittent pulsation of distinct emitters of differing colors with only two electric conductors from the generator to a plurality of emitters and no control electronics. Thus, the rotational speed of the blade determines both the intensity and pulse length of respective light emitters, the intensity and pulse length each roughly proportional to the velocity of the moving air driving the generator or moving field coil and producing the virtual color perceived. Ideally, the light emitters maybe operated at a substantial over voltage; however, the pulse length per cycle is limited. As a result, the light emitters produce high intensity bursts of light without shortening the useful life of the light emitters.

The above wind reactive blades may take the form of various horizontal shaft or vertical shaft windmills with slender or broad blades and with single or multiple blades. The blades should be formed to respond to light breezes or fluid flow but sufficiently inefficient at high wind speed to limit rotational speed and thereby eliminate the need for speed-governing devices.

The horizontal shaft version of the device may be equipped with a tail and vertical shaft support in the manner of a windmill to track the wind direction and thereby present varying angles to a stationary viewer. The overall effect is of a changing light show of both perceived and real flashing colors.

The new illuminated device may also be constructed with horizontal blades rotating about a horizontal axis or with a vertical axis that also serves as a hanger, in the manner of a tree ornament. The very simple inexpensive mechanical and electrical structure of the illuminated devices makes possible very inexpensive ornamental windmill and tree decorating items embodying the invention.

BRIEF DESCRIPTION OF THE DRAWINGS

FIG. 4 is an axial view of an S-shaped rotor blade;

FIG. 5 is a horizontal windmill utilizing the rotor blade of FIG. 4;

FIG. 6 is a vertical hanging windmill utilizing the rotor blade of FIG. 4;

FIG. 7 is a shaftless vertical hanging windmill utilizing the rotor blade of FIG. 4;

FIG. 8 is a weathervane-equipped version of the windmill in FIG. 1; and

FIG. 9 is a four-bladed version of the windmill in FIG. 1.

BRIEF DESCRIPTION OF THE PREFERRED EMBODIMENTS

Figure 1:
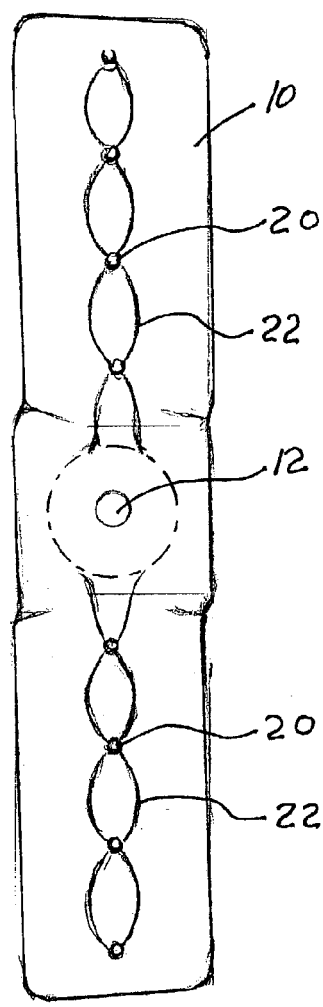
FIG. 1 illustrates a rotatable blade equipped with light emitters.
Figure 2:
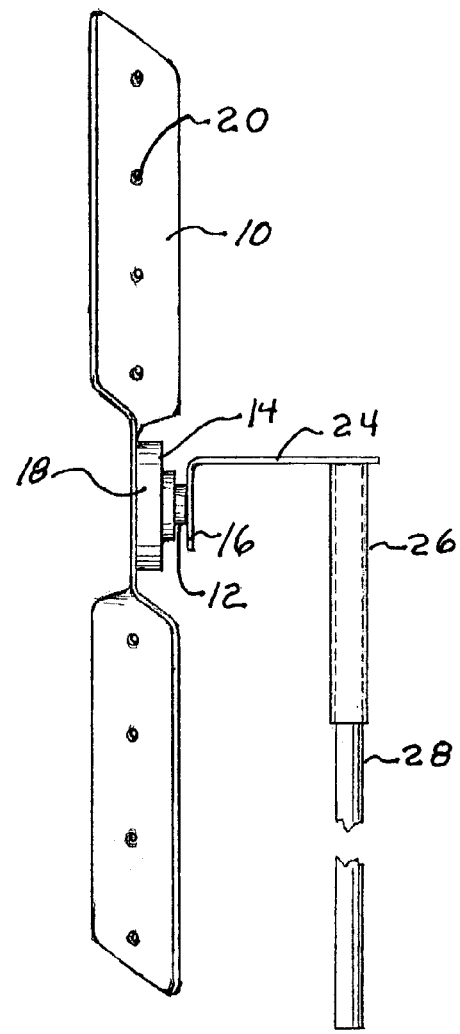
FIG. 2 is a side view of the blade of FIG. 1 and pivot mount.

Illustrated in FIGS. 1 and 2 is a blade 10 on a pivot 12 which is the axle shaft of a small electric generator 14. The axle shaft 12 is fastened to a support 16, and the generator casing 18 and field coils therein are fastened to the blade 10. A suitable inexpensive generator 14 can be a computer disc drive stepper motor, either new or salvaged.

Figure 3:
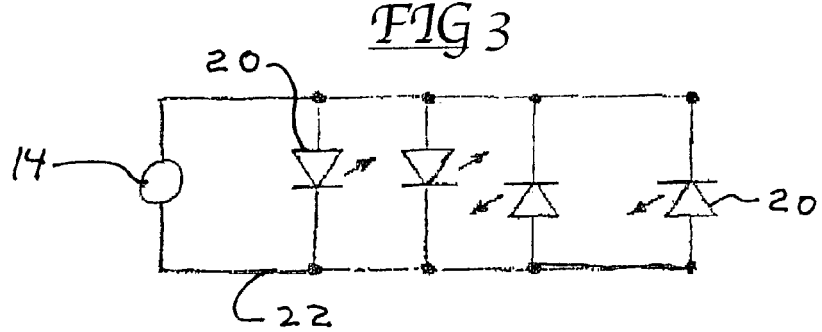
FIG. 3 is a circuit diagram for the light emitters.

A plurality of light emitters 20, preferably light emitting diodes in colors as desired, are attached to the blade 10 and wired into a simple ladder circuit 22 as shown in FIG. 3. Some of the light emitting diodes 20 may be reverse biased, as shown. The simple ladder circuit 22 is connected to the field coils of the motor 14. The support 16 is attached to a support bracket 24 and pivot tube 26. The pivot tube 26 in turn rests on a support pole 28.

As is readily apparent, the blade 10 rotates under the influence of a breeze causing the motor 14 to operate as a generator and illuminate the light emitters 20. The particular motor 14 selected will provide steady or intermittent power to the light emitters 20 resulting in pleasing and colorful patterns of light that partially merge in the afterimage blending effect. With use of a computer disc drive motor, the motor is typically an alternating current stepper motor without any external control circuitry. The result is a flashing pattern of lights in various colors that merge and diverge with changing blade rotational speed. In outdoor applications in the mid-west, wind speed is ever changing, resulting in an ever changing color display.

In FIG. 4, the blade 30 is S-shaped in profile about a central axis 32. The light emitters 34 may be placed in two or more rows on each blade 30 with the colors selected as desired. As above, a simple motor 36 acts as a generator with the motor shaft affixed to a support.

In FIG. 5, the S-shaped blade 30 of FIG. 4 is mounted in a horizontal configuration with a pivot at each end comprising a motor 36 with the motor shaft 38 affixed to a support 40. The motor casing 42 for each motor 36 is affixed to the blade 30 with the field winding electrically connected to some of the light emitters 34.

In FIG. 6, the S-shaped blade of FIG. 4 is hung from a vertical support shaft 44 attached to the motor shaft 46 of the motor 48. The motor casing 50 is attached to the S-shaped blade 52 having the light emitters 54 thereon electrically connected to the motor field windings as above. As shown, the blade 52 can resemble a leaf with the entire device sized to be a tree ornament hung from the support hook 56.

The hanging shaft shown in FIG. 6 may be replaced by a hanging loop 58 affixed to the motor shaft 60 of the motor 62 and the light emitters 64 attached to the blade 66 peripheries, as illustrated in FIG. 7. This version of the device can use very thin aerodynamic blades 66 as the peripheries with a vertical central support 68 descending downwardly from the motor 62 external case.

In FIG. 8, the windmill device of FIG. 1 includes a decorative weathervane 70 mounted to the support bracket 24 to more quickly follow abrupt changes in wind direction and thereby provide the quick changes in viewing angle illusory effect of the illumination on the blades 10.

In FIG. 9, a four-bladed 72 windmill of extremely inexpensive thin plastic folded sheets is illustrated. Such a windmill can be manufactured with the light emitters 74 and motor 62 for very little more than the windmill without the lighting.

What is claimed is:

1. A windmill device for the generation and illusion of changing luminous colors in space comprising:
    a plurality of variously colored light emitters mounted on at least two blades, the blades being rotatable about a first pivot,
    a second pivot on a support and having an axis differing from the first pivot, the first pivot being mounted on the second pivot, and
    an electric generator having a generator shaft, the generator shaft forming the first pivot and the generator being affixed to the blades for rotation therewith, the generator being electrically connected to the variously colored light emitters,
    wherein luminous color patterns are generated by the afterimage effect of the variously colored light emitters while being rotated about the pivot.

2. The device of claim 1 wherein at least one of the variously colored light emitters is electrically reverse biased relative to the other variously colored light emitters in the electrical connection to the generator and the generator is a stepper motor.

3. A windmill device for the generation and illusion of changing luminous colors in space comprising:
    at least two blades extending between two pivots, the two pivots being on the same axis,
    a plurality of variously colored light emitters mounted on the at least two blades, and
    at least one electric generator having a generator shaft, the generator shaft forming at least one of the pivots and the generator being affixed to the blades for rotation therewith, the generator being electrically connected to the variously colored light emitters,
    wherein luminous color patterns are generated by the afterimage effect of the variously colored light emitters while being rotated about the pivots.

4. The device of claim 3, including a second electric generator having a second generator shaft forming the other pivot and the second generator being affixed to the blades for rotation therewith, the second generator being electrically connected to at least one of the variously colored light emitters.

5. The device of claim 4 wherein the generators are stepper motors.

6. The device of claim 4 wherein at least one of the variously colored light emitters is electrically reverse biased relative to the other variously colored light emitters in the electrical connection to one of the generators.

7. The device of claim 3 wherein at least one of the variously colored light emitters is electrically reverse biased relative to the other variously colored light emitters in the electrical connection to the at least one generator and the at least one generator is a stepper motor.

8. A windmill device for the generation and illusion of changing luminous colors in space comprising:
    a vertical shaft having means at the upper end of the shaft for supporting the device,
    an electric generator at the lower end of the vertical shaft, the generator shaft forming a pivot at the lower end of the vertical shaft,
    at least one blade affixed to the generator and rotatable with the generator about the generator shaft, and
    a plurality of variously colored light emitters mounted on the at least one blade and electrically connected to the generator,
    wherein luminous color patterns are generated by the afterimage effect of the variously colored light emitters while being rotated about the pivot.

9. The device of claim 8 wherein at least one of the variously colored light emitters is electrically reverse biased relative to the other variously colored light emitters in the electrical connection to the generator.

10. The device of claim 9 wherein the generator is a stepper motor.

11. The device of claim 8 wherein the generator is a stepper motor.

* * * * *